No. 818,158. PATENTED APR. 17, 1906.
C. GIRARDOT.
MACHINE FOR MANUFACTURING PIPES OR CONDUITS FROM CEMENT, &c.
APPLICATION FILED JAN. 3, 1905.

2 SHEETS—SHEET 2.

Witnesses:

Inventor
Claude Girardot
By
James L. Norris
Atty

UNITED STATES PATENT OFFICE.

CLAUDE GIRARDOT, OF VITRY-LE-FRANÇOIS, FRANCE, ASSIGNOR TO SOCIÉTÉ J. ET A. PAVIN DE LAFARGE, OF VIVIERS, FRANCE.

MACHINE FOR MANUFACTURING PIPES OR CONDUITS FROM CEMENT, &c.

No. 818,158.      Specification of Letters Patent.      Patented April 17, 1906.

Application filed January 3, 1905. Serial No. 239,509.

*To all whom it may concern:*

Be it known that I, CLAUDE GIRARDOT, engineer, a citizen of the French Republic, residing at Vitry-le-François, Marne, France, have invented certain new and useful Improvements in Machines for Manufacturing Pipes or Conduits from Cement Mortar or the Like, of which the following is a specification.

This invention has for its object to provide a machine for manufacturing pipes or conduits from cement, mortar, or the like by mechanical ramming with adjustable automatic feed of the material, so that the pipes produced are homogeneous throughout their length, a result which is not practically attainable by hand-ramming.

Figure 1:
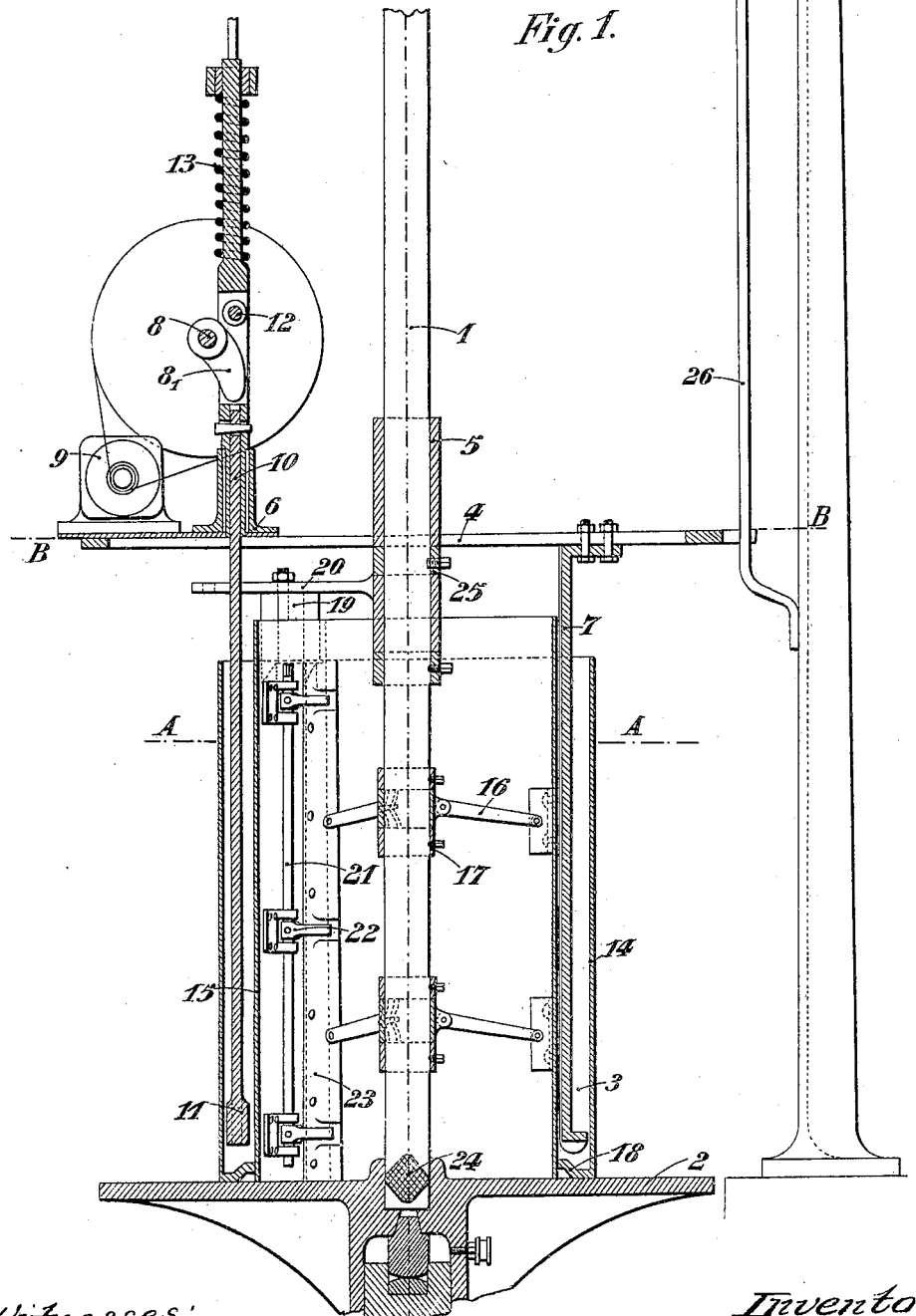
Figure 2:
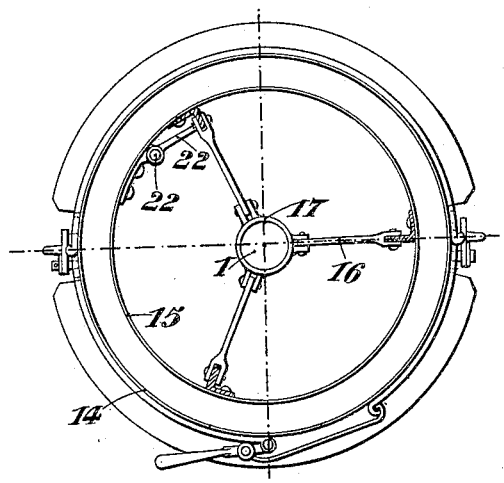
Figure 3:
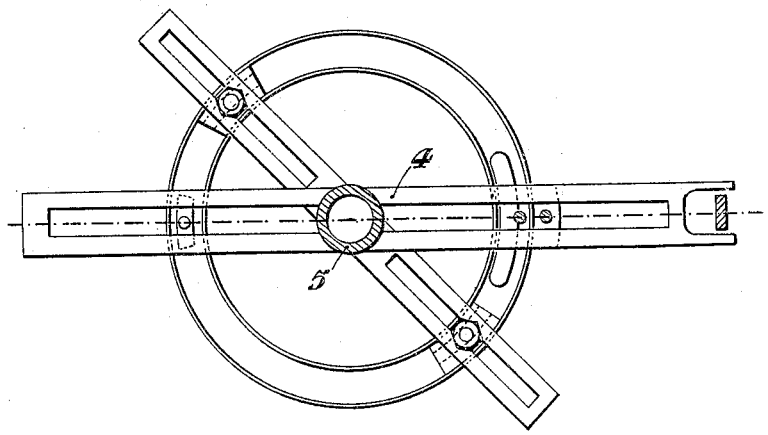

In the accompanying drawings, Figure 1 is a vertical section of the machine. Fig. 2 is a section through the line A A of Fig. 1. Fig. 3 is a section through the line B B of Fig. 1.

The machine proper consists of a bed-plate carrying a vertical shaft 1, resting at its lower end in a rotary table 2, on which are arranged the molds 3. The said vertical shaft 1 has rotary motion imparted to it by any suitable means. A suitable feeding device (not shown) may be employed for supplying material to the mold. A platform 4, carried by a long sleeve 5, loose on the vertical shaft 1, carries on one of its sides a ram 6, while the opposite side carries a device 7 for adjusting the height of the ram relatively to the contents of the mold. The ram has a comparatively short stroke and is worked at a high speed—say from three to six hundred blows per minute—and it can be actuated by electricity or compressed air or any known or suitable mechanical means. For example, the ram-operating mechanism may comprise a horizontal shaft 8, carrying a wiper 8′ and rotated by an electric or other motor 9. The wiper in its rotation lifts a vertical rod 10, (preferably by bearing on a roller 12 on the rod,) terminating at its lower end in a ram 11. When the wiper 8′ ceases to bear on the roller 12, the ram falls, and the action of gravity may be supplemented by that spring 13, surrounding the vertical rod and of such strength as will produce the desired acceleration of the movement of the ram, this acceleration varying with the speed of rotation of the mold. The height to which the ram is raised is constant; but the point at which the downward stroke terminates varies with the amount of material in the mold. The whole of the ram-operating mechanism may be arranged on the platform 4, and it may be brought nearer to or farther from the vertical shaft 1, so as to bring the ram over the center of the width of material to be rammed down.

The mold consists of an external casing 14 of cylindrical or other shape (made in two or more parts connected together by bolts, keys, straps, or other suitable devices) and of an internal core 15 of cylindrical shape, preferably made of a sheet of rolled steel the edges of which overlap each other by about three centimeters, the core having then a diameter which is, say, one centimeter less than the bore of the pipe or conduit to be made. At its lower and upper parts the core is connected by links 16 to rings 17, fixed to the vertical shaft 1 of the machine. These links are jointed to the rings and the core and are slightly oblique, so that as they descend or rise the core may be contracted or expanded until the two edges of the core butt together.

A ring 18—say of cast-iron and of suitable shape—is laid at the lower part of the mold between the core and casing 14 to keep them at a uniform distance apart and give the necessary shape to the lower part of the pipe or conduit, the links besides serving to expand the core keep it coaxial with the shaft. Metal templets 19, of suitable shape and carried by an arm 20, are arranged at the upper part of the mold between the casing and core, so as to keep the top of the casing coaxial with the shaft and at the same time form the upper part of the pipe or conduit.

A small vertical shaft 21 inside the core carries arms 22, which by slight rotary motion are caused to bear on an angle-iron 23, riveted inside the core and acting as a stop to prevent the core from closing under the reactions of the ramming operation.

The operation of the machine is as follows: The vertical shaft 1, carrying the core, (which shaft is provided with a balanced raising mechanism,) being in its raised position, the outer casing 14 of the mold is placed on the rotary table, together with the ring 18, for shaping the lower part of the pipe or conduit. The said vertical shaft is then lowered with the templets until the lower part of the said vertical shaft engages with the table at 24, so that the core 15 rests on the said table 2, and the links 16 give the normal diameter to the core and the templets 19 come between the upper parts of the core and casing, thereby rendering them coaxial with the shaft. In this position the platform 4, carrying the ram, which is only partly balanced, is lowered and bears on a ring 25 at the upper part of the core. The lower part of the ram is then a little above the ring 18 in the bottom of the space between the core and casing, while the device 7 for adjusting the height of the platform above the material in the mold rests on the said ring. The material having been placed in the feeding device, which has been adjusted to work at the proper speed, the vertical shaft and the rotary-table mold are rotated. The platform 4 being prevented by a stop 26 from participating in the rotary motion of the shaft, the whole of the ramming device moves in one and the same vertical plane. As the rotary motion proceeds the mold is filled by the automatic feeding device with a layer of material of a thickness which can be varied by the attendant according to the amount of ramming to be obtained. The ram by repeated blows compresses the material firmly between the outer casing and the core, and the part that has thus been rammed comes in contact with the device 7 for adjusting the height of the platform, which is thereby raised so as to be at a constant height above the material to be rammed. When the mold is filled to the height of the templets 19, the working of the ram is stopped and the ramming mechanism is raised, while the supply of material and the rotation of the vertical shaft still continue. The material on passing under the templets is in consequence of the rotary motion firmly compressed, and the upper end of the pipe or conduit is shaped in accordance with the contour of the said templets. The pipe or conduit being finished, the withdrawal of the mold is effected by raising the vertical shaft, which takes along with it the core, which is contracted automatically by the motion of the links 16, and the outer casing is removed from outside the pipe or conduit formed therein and resting on the aforesaid ring.

The pipe or conduit can then be removed from the rotary table.

Having thus described and ascertained the nature of my invention and in what manner the same may be performed, I declare that what I claim is—

1. A molding-machine of the class described, comprising a rotary table, a mold mounted on said table comprising a casing and a core, a shaft carrying said core and extending through the latter and being detachably connected to said table for rotating the same, a platform loosely mounted on said shaft, ramming mechanism carried by said platform, a gage carried by said platform for adjusting the height thereof in accordance with the height of the material in the mold, and means carried by said shaft for expanding and contracting the core.

2. A molding-machine of the class described, comprising a rotary table, a mold mounted thereon comprising a casing and an expansible core, means located within said core for locking it in its expanded position, a shaft extending through said core and detachably connected to said table for rotating the same, arms pivotally connecting said shaft and said core, a support mounted on the said shaft, templets carried by said support and extending between said casing and said core to maintain the latter parts in concentric relation, a platform loosely mounted on said shaft, a ramming device mounted on said platform, and a gage mounted on said platform for adjusting the height thereof in accordance with the amount of material in the mold.

3. A mold involving an outer casing and an inner expansible split core, a stop carried by one part of said core, a rotary shaft mounted in the other part, and locking-arms carried by said rotary shaft and adapted to be turned thereby into engagement with said stop to lock the core in its expanded position.

In testimony whereof I have hereunto set my hand in presence of two subscribing witnesses.

CLAUDE GIRARDOT.

Witnesses:
PAUL BLUM,
ALBERT TRUBAULT.